US011870194B2

(12) United States Patent
Chen et al.

(10) Patent No.: US 11,870,194 B2
(45) Date of Patent: Jan. 9, 2024

(54) SHAPED CONTACT

(71) Applicants: Tyco Electronics (Shanghai) Co. Ltd, Shanghai (CN); Tyco Electronics (Dongguan) Ltd., Dongguan (CN)

(72) Inventors: Jianchou (Jackson) Chen, Dongguan (CN); YuQiang (Thomas) Zhao, Shanghai (CN); Hongbo (Noah) Zhou, Dongguan (CN); Wei Yao, Kunshan (CN); Zhiwei (Will) Liu, Dongguan (CN); Binglin (Aaron) Feng, Dongguan (CN)

(73) Assignees: Tyco Electronics (Shanghai) Co., Ltd., Shanghai (CN); Tyco Electronics (Dongguan) Ltd., Dongguan (CN)

( * ) Notice: Subject to any disclaimer, the term of this patent is extended or adjusted under 35 U.S.C. 154(b) by 0 days.

(21) Appl. No.: 17/704,594

(22) Filed: Mar. 25, 2022

(65) Prior Publication Data

US 2022/0311150 A1 Sep. 29, 2022

(30) Foreign Application Priority Data

Mar. 25, 2021 (CN) ......................... 202110323246.2

(51) Int. Cl.
*H01R 4/18* (2006.01)
*H01R 13/11* (2006.01)

(52) U.S. Cl.
CPC ............. *H01R 4/184* (2013.01); *H01R 13/11* (2013.01)

(58) Field of Classification Search
CPC .. H01R 4/184–186; H01R 4/188; H01R 4/18; H01R 4/04; H01R 4/10; H01R 4/12; H01R 4/14; H01R 4/16; H01R 4/26; H01R 13/11; H01R 13/10; H01R 13/08; H01R 13/02; H01R 13/04; H01R 13/05; H01R 13/052; H01R 13/055; H01R 13/057; H01R 13/111; H01R 13/112; H01R 13/113; H01R 13/114; H01R 13/115; H01R 13/20; H01R 13/245; H01R 13/2414
See application file for complete search history.

(56) References Cited

U.S. PATENT DOCUMENTS

| | | | | | |
|---|---|---|---|---|---|
| 3,577,119 | A * | 5/1971 | Delyon | H01R 4/184 | 439/881 |
| 3,670,298 | A * | 6/1972 | Klumpp, Jr. | H01R 4/184 | 439/877 |
| 3,771,111 | A * | 11/1973 | Pritulsky | H01R 43/058 | 439/867 |
| 4,298,243 | A * | 11/1981 | Swengel, Jr. | H01R 13/115 | 439/881 |
| 4,421,375 | A * | 12/1983 | Coldren | H01R 4/2462 | 439/423 |
| 5,211,589 | A * | 5/1993 | McCardell | H01R 13/4364 | 439/879 |

(Continued)

*Primary Examiner* — Harshad C Patel
(74) *Attorney, Agent, or Firm* — Barley Snyder

(57) ABSTRACT

A flag shape contact includes a substrate, and a plug-in structure for receiving a mating contact. The plug-in structure extends from the substrate in a first direction. A riveting structure is provided for riveting or connecting a wire conductor to the contact. The riveting structure extends from the substrate in a second direction, distinct from the first direction. The riveting structure is disposed outside an extension area of the plug-in structure in the first direction.

13 Claims, 4 Drawing Sheets

(56) References Cited

U.S. PATENT DOCUMENTS

| | | | | | |
|---|---|---|---|---|---|
| 6,019,646 | A * | 2/2000 | Okamura | H01R 13/18 | 439/852 |
| 6,086,433 | A * | 7/2000 | Hils | H01R 4/185 | 439/850 |
| 6,997,746 | B2 * | 2/2006 | Taylor | H01R 4/183 | 439/585 |
| 7,014,510 | B2 * | 3/2006 | Powers | H01R 33/09 | 439/699.2 |
| 7,198,526 | B1 * | 4/2007 | MacNeil | H01R 4/185 | 439/881 |
| 7,563,143 | B2 * | 7/2009 | Okabe | H01R 4/2416 | 439/221 |
| 7,976,351 | B2 * | 7/2011 | Boemmel | H01R 13/432 | 439/748 |
| 9,692,163 | B1 * | 6/2017 | Didonato | H01R 4/70 | |
| 10,027,037 | B2 * | 7/2018 | Didonato | H01R 4/48 | |
| 10,079,440 | B1 * | 9/2018 | Didonato | H01R 13/115 | |
| 10,199,780 | B2 * | 2/2019 | Volkmann | H01R 4/20 | |
| 10,348,044 | B2 * | 7/2019 | Surer | H01R 4/64 | |
| 10,992,087 | B2 * | 4/2021 | Hoyack | H01R 4/2495 | |
| 11,264,735 | B1 * | 3/2022 | Randolph | H01R 4/188 | |
| 2015/0255886 | A1 * | 9/2015 | Schmidt | H01R 4/183 | 439/877 |

* cited by examiner

SHAPED CONTACT

CROSS-REFERENCE TO RELATED APPLICATIONS

This application claims the benefit of Chinese Patent Application No. CN 202110323246.2 filed on Mar. 25, 2021 in the China National Intellectual Property Administration, the whole disclosure of which is incorporated herein by reference.

FIELD OF THE INVENTION

The present disclosure relates to electrical contacts.

BACKGROUND

In the related art, referring to FIG. 1, a flag shape contact generally includes a substrate 1 and a plug-in structure 2 and a riveting structure 3 extending from the substrate 1. As shown, a wire conductor crimping piece 31 of the riveting structure 3 is formed within an extension plane of a paired-terminal receiving socket of the plug-in structure 2 in an insertion direction. Accordingly, an insertion action of the contact is constrained by the riveting structure 3. Moreover, the riveting structure 3 also includes a wire sheath crimping piece 32 disposed in parallel with the wire conductor crimping piece 31, resulting in a complex structure of the entire flag shape contact. In addition, in the related art, as the entire flag shape contact is stamped from a single metal sheet material, the wire conductor crimping piece 31 needs to be cut out from a portion of the substrate 1 corresponding to the wire conductor crimping piece 31. As a result, there is a large interspace 11 in the substrate 1, which in turn leads to a smaller physical area of the substrate located between the plug-in structure 2 and the riveting structure 3 and corresponding reduction in current carrying capacity of the entire contact. In addition, in the existing flag shape contact in which the wire conductor crimping piece has a crimping tongue, a notch for the insertion and fitting of the crimping tongue in the flag shape contact is required. However, the notch results in a greater height of the riveting structure. In this way, the contact cannot be used in electrical connection configurations with limited space and/or limited height.

SUMMARY

According to an embodiment of the present disclosure, a flag shape contact includes a substrate, and a plug-in structure adapted to receive a mating contact. The plug-in structure extends from the substrate in a first direction. A riveting structure is provided for riveting a wire conductor. The riveting structure extends from the substrate in a second direction, distinct from the first direction. The riveting structure is disposed outside of an extension area of the plug-in structure in the first direction.

BRIEF DESCRIPTION OF THE DRAWINGS

The invention will now be described by way of example with reference to the accompanying Figures, of which.

DETAILED DESCRIPTION OF THE EMBODIMENTS

Figure 1:
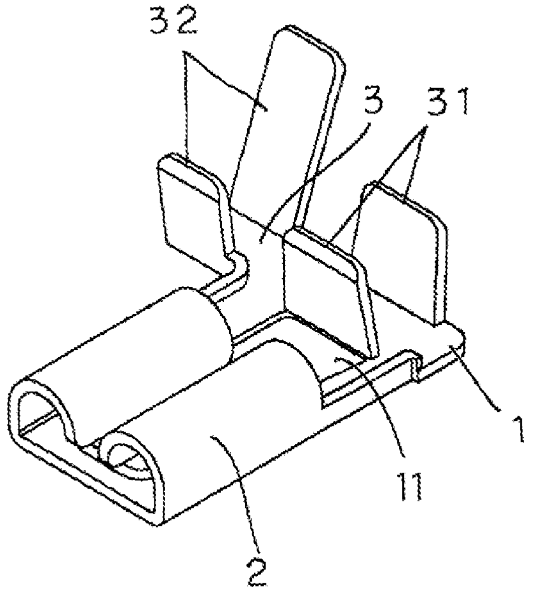
FIG. 1 shows a schematic perspective view of a flag shape contact in the related art.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to one embodiment of the present disclosure, a flag shaped contact includes a substrate, a plug-in structure for plugging-in of a mating contact, and a riveting structure for riveting a wire conductor. The plug-in structure extends from the substrate in a first direction. The riveting structure extends from the substrate in a second direction, distinct from the first direction. The riveting structure is disposed outside an extension area of the plug-in structure in the first direction.

Figure 2:
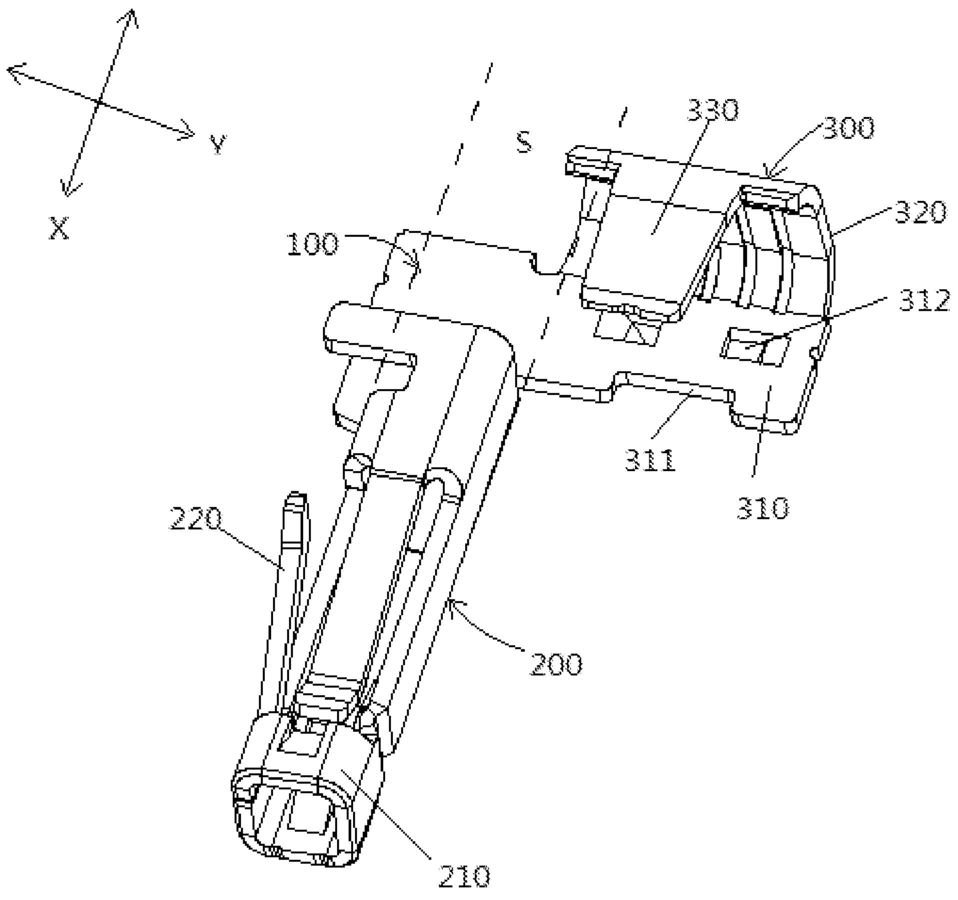
FIG. 2 shows a schematic perspective view of a flag shape contact according to an exemplary embodiment of the present disclosure.
Figure 3:
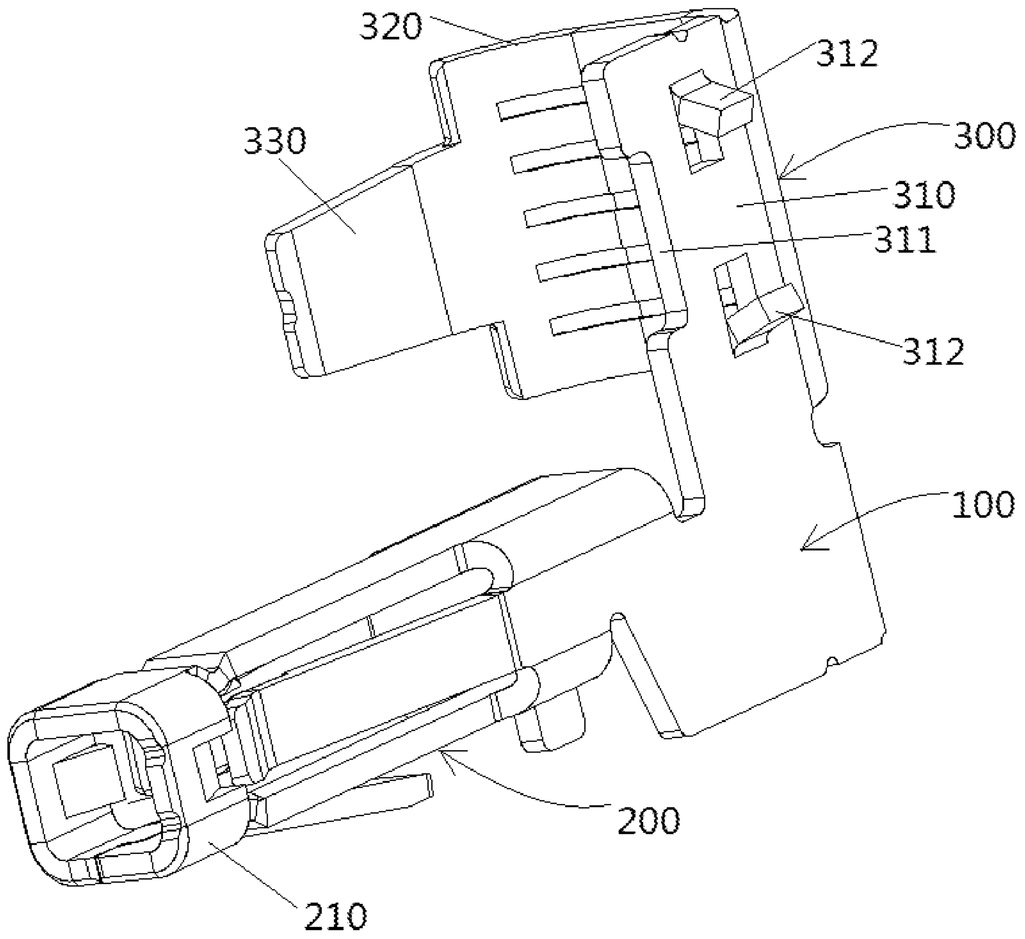
FIG. 3 shows another schematic perspective view of the flag shape contact according to the exemplary embodiment of the present disclosure.
Figure 4:
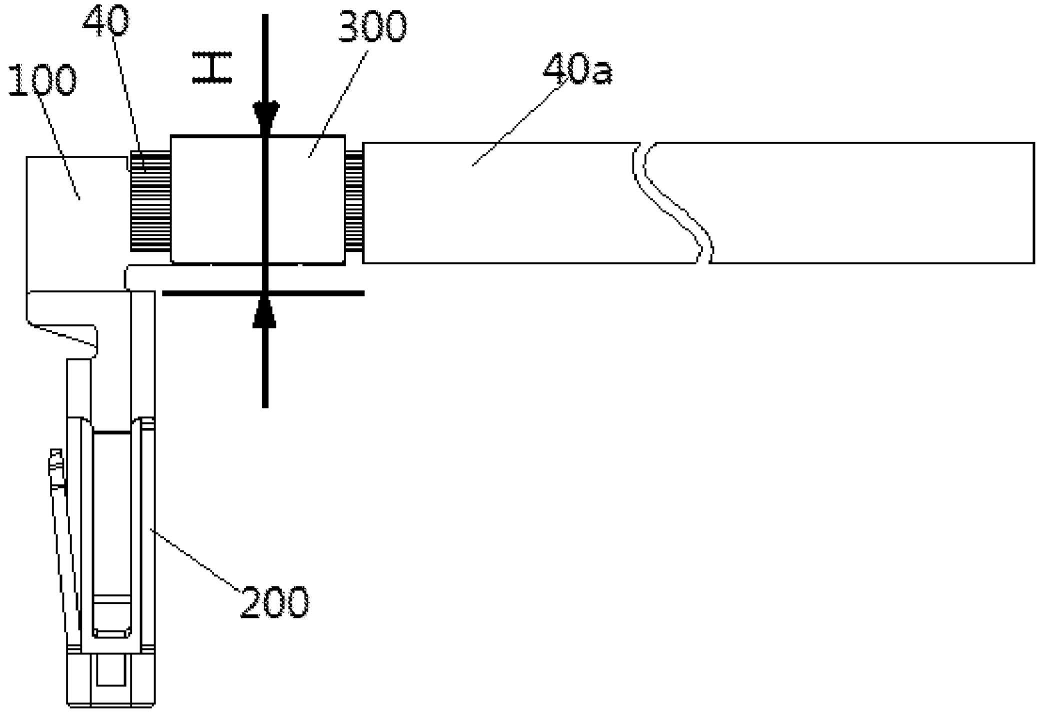
FIG. 4 is a schematic view showing a wire conductor is riveted by the flag shape contact according to the exemplary embodiment of the present disclosure.

FIG. 2 shows a schematic perspective view of a flag shape contact according to an exemplary embodiment of the present disclosure. FIG. 3 shows another schematic perspective view of the flag shape contact according to the exemplary embodiment of the present disclosure. FIG. 4 is a schematic view showing a wire conductor is riveted by the flag shape contact according to the exemplary embodiment of the present disclosure.

As shown in FIGS. 2 and 3, the flag shape contact includes a substrate 100 and a plug-in structure 200 for plugging-in of a mating contact (not shown). The plug-in structure 200 extends from the substrate 100 in a first direction X. A contact further includes a riveting structure 300 for riveting a wire conductor 40 (see FIG. 4). The riveting structure 300 extends from the substrate 100 in a second direction Y, with the second direction Y being different from the first direction X. The riveting structure 300 is disposed outside an extension area S (the area defined by the dotted line in the drawings) of the plug-in structure 200 in the first direction X. More specifically, in an exemplary embodiment of the present disclosure, as shown in FIG. 2, at least a portion of the substrate 100 is located within the extension area S. According to the flag shape contact of the forgoing various exemplary embodiments of the present disclosure, the riveting structure is disposed outside the extension area of the plug-in structure, so that the crimping piece of the riveting structure does not need to be cut out from the substrate, which increases the physical area of the substrate, and may carry more current and improves the current carrying capacity of the entire contact, compared with the flag shape contact in the related art.

In an exemplary embodiment of the present disclosure, as shown in FIG. 2, the first direction X is substantially perpendicular to the second direction Y. The first direction X may also be a plug-in direction of the mating contact into the plug-in structure, and the second direction Y may also be a plug-in direction of the wire conductor into the riveting structure. That is, according to the flag shape contact of the forgoing various exemplary embodiments of the present disclosure, the plug-in direction of the wire conductor into the riveting structure is substantially perpendicular to the plug-in direction of the mating contact into the plug-in structure.

In an exemplary embodiment of the present disclosure, as shown in FIGS. 2 and 3, the riveting structure 300 includes a base portion 310 and a crimping portion 320. The base portion 310 extends from the substrate 100 and is parallel to the substrate 100. One end of the crimping portion 320 extends from one side edge of the base portion 310. According to the flag shape contact of the forgoing various exemplary embodiments of the present disclosure, a crimping piece for a wire sheath 40*a* (see FIG. 4) is omitted, which not only simplifies the structure, but also saves sheet metal material, simplifies the mold structure and reduces product cost, compared with the flag shape contact of the prior art.

In an exemplary embodiment of the present disclosure, as shown in FIGS. 2 and 3, the other end of the crimping portion 320 is formed with a crimping tongue 330. Another side edge of the base portion 310 opposite to the crimping portion 320 is formed with a notch 311 for insertion of the crimping tongue 330. Compared with the existing configuration in which the notch is opened in the interior of the substrate, according to the flag shape contact of the forgoing various exemplary embodiments of the present disclosure, the notch for insertion of the crimping tongue of the riveting structure is provided on one side edge of the base portion of the riveting structure. This arrangement reduces the height of the entire riveting structure, so that the contact is more suitable for use in electrical connection configurations with limited space or limited height.

In an exemplary embodiment of the present disclosure, as shown in FIGS. 2 and 3, the base portion 310 is further formed with a holding structure 312 for holding the crimping tongue 330 inserted into the notch 311 in place. The holding structure 312 extends from the base portion 310. In the illustrated embodiment, the holding structure 312 may be formed from the base portion 310 (e.g., torn therefrom). By providing the holding structure 312, the crimping tongue 330 inserted into the notch 311 for riveting the wire conductor 40 can be fixed by the holding structure 312 to prevent the crimping tongue 330 from jumping out of the notch 311.

In an exemplary embodiment of the present disclosure, as shown in FIGS. 2 and 3, the plug-in structure 200 includes a socket portion 210 and an elastic cantilever 220. The socket portion 210 extends from the substrate 100. One end of the elastic cantilever 220 extends from the socket portion 210, and the other end of the elastic cantilever 220 is suspended.

In an exemplary embodiment of the present disclosure, as shown in FIGS. 2 and 3, the socket portion 210 has a single-socket configuration for plug-in of a single mating contact. In another exemplary embodiment of the present disclosure that is not shown, the socket portion may also have a dual-sockets configuration for plug-in of a pair of mating contacts.

In an exemplary embodiment of the present disclosure, as shown in FIGS. 2 to 4, the substrate 100, the plug-in structure 200 and the riveting structure 300 may be made from a single sheet metal material.

In summary, according to the flag shape contact of the forgoing various exemplary embodiments of the present disclosure, the riveting structure is disposed outside the extension area of the plug-in structure, so that the crimping piece of the riveting structure does not need to be cut out from the substrate. This increases the physical area of the substrate, and improves the current carrying capacity of the entire contact. According to the flag shape contact of the forgoing various exemplary embodiments of the present disclosure, it not only simplifies the structure, but also saves sheet metal materials, simplifies the mold structure, and reduces product costs, compared with the flag shape contact in the related art. In addition, according to the flag shape contact of the forgoing various exemplary embodiments of the present disclosure, the notch for insertion of the crimping tongue of the riveting structure is provided on one side edge of the base portion of the riveting structure, which can effectively reduce the height of the entire riveting structure, and is more suitable for use in electrical connection configurations with limited space or limited height, compared with the existing configuration in which the notch is opened in the interior of the substrate.

In addition, those areas in which it is believed that those of ordinary skill in the art are familiar, have not been described herein in order not to unnecessarily obscure the invention described. Accordingly, it has to be understood that the invention is not to be limited by the specific illustrative embodiments, but only by the scope of the appended claims.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of the elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A flag shape contact, comprising:

a substrate;

a plug-in structure receiving a mating contact, the plug-in structure extending from the substrate in a first direction; and a riveting structure adapted to attach a wire conductor to the contact, the riveting structure extending from the substrate in a second direction, distinct from the first direction, the riveting structure is disposed outside an extension area of the plug-in structure in the first direction, the riveting structure defining:

a base portion extending from and parallel to the substrate, and a crimping portion, wherein one end of the crimping portion extends from one side edge of the base portion and another end of the crimping portion is formed with a crimping tongue having a planar surface, the base portion including a notch in a side edge for receiving the planar surface of the crimping tongue.

2. The flag shape contact according to claim 1, wherein the first direction is perpendicular to the second direction.

3. The flag shape contact according to claim 1, wherein the plug-in structure comprises:

a socket portion extending from the substrate; and an elastic cantilever having an end extending from the socket portion.

4. The flag shape contact according to claim 3, wherein the socket portion has a single-socket configuration.

5. The flag shape contact according to claim 3, wherein the socket portion has a dual-socket configuration.

6. The flag shape contact according to claim 1, wherein the substrate, the plug-in structure and the riveting structure are made from a single sheet metal material.

7. The flag shape contact according to claim 1, wherein at least a portion of the substrate is located within the extension area.

8. An electrical contact, comprising:

a plug-in structure adapted to receive a mating contact and extending in a first direction; and a clamping structure for attaching the contact to a wire conductor, the clamping structure extending in a second direction, distinct from the first direction, and disposed outside an extension area of the plug-in structure in the first direction, wherein the clamping structure comprises a base portion and a crimping portion, one end of the crimping portion extending from one side edge of the base portion, and another end of the crimping portion is formed with a crimping tongue having a planar surface, and a second side edge of the base portion opposite the crimping portion defines a notch configured to receive the planar surface of the crimping tongue.

9. The electrical contact according to claim 8, wherein the base portion is formed with a pair of holding arms for holding the crimping tongue inserted into the notch in place.

10. The electrical contact according to claim 8, wherein the plug-in structure comprises a socket portion and an elastic cantilever, one end of the elastic cantilever extending from the socket portion.

11. The electrical contact according to claim 10, wherein the socket portion has a single-socket opening.

12. The electrical contact according to claim 11, wherein the socket portion has at least two socket openings.

13. A flag shaped contact comprising:

a substrate defining a planar surface having longitudinal edges and at lateral edges;

a plug-in structure configured to receive a mating contact, wherein the plug-in structure extends from the substrate in a first direction and includes a socket portion that extends from a first longitudinal edge of the substrate;

a riveting structure configured to securely fix a wire conductor, the riveting structure extending from a second longitudinal edge of the substrate and disposed outside an extension area of the plug-in structure, wherein the riveting structure includes a base portion that extends from and in the same plane parallel to the substrate, the riveting structure including a crimping portion extending away from the base portion, wherein an end of the crimping portion extends from a longitudinal edge of the base portion and a notch in an edge the base portion configured to receive a planar surface of a crimping tongue.

* * * * *